(12) United States Patent
Birk et al.

(10) Patent No.: US 6,813,072 B2
(45) Date of Patent: Nov. 2, 2004

(54) METHOD FOR ADJUSTING A MICROSCOPE AND MICROSCOPE WITH A DEVICE FOR ADJUSTING A LIGHT BEAM

(75) Inventors: Holger Birk, Meckesheim (DE); Johan Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 341 days.

(21) Appl. No.: 09/683,824

(22) Filed: Feb. 20, 2002

(65) Prior Publication Data

US 2002/0163716 A1 Nov. 7, 2002

(30) Foreign Application Priority Data

Mar. 13, 2001 (DE) .......................................... 101 11 824

(51) Int. Cl.$^7$ ............................................. G02B 21/06
(52) U.S. Cl. ........................ 359/388; 359/368; 359/385
(58) Field of Search ................................ 359/368–390; 250/201.1–216

(56) References Cited

U.S. PATENT DOCUMENTS

| 5,084,612 | A | * | 1/1992 | Iwasaki et al. | ............. 250/216 |
| 5,206,766 | A | | 4/1993 | Bassett et al. | ............. 359/896 |
| 5,532,873 | A | * | 7/1996 | Dixon | ........................ 359/388 |
| 5,657,128 | A | * | 8/1997 | Muller et al. | ............... 356/612 |
| 5,717,666 | A | | 2/1998 | Park | ........................ 369/44.11 |
| 6,072,625 | A | * | 6/2000 | Kitahara et al. | ............. 359/388 |
| 6,108,127 | A | * | 8/2000 | Atkinson | ..................... 359/389 |
| 6,570,705 | B2 | * | 5/2003 | Bewersdorf et al. | ........ 359/388 |
| 6,693,272 | B2 | * | 2/2004 | Adachi et al. | ............. 250/216 |

* cited by examiner

Primary Examiner—Thong Q. Nguyen
(74) Attorney, Agent, or Firm—Houston Eliseeva LLP (57) ABSTRACT

A device for adjusting the light beam in a microscope. The device couples the light beam into a housing of the device. A first and a second detectors are positioned at different distances to the coupling point. In the line of coupled in light beam at least one beam splitter is provided, which directs the coupled-in light beam onto at least one of the photo detectors.

27 Claims, 5 Drawing Sheets

METHOD FOR ADJUSTING A MICROSCOPE AND MICROSCOPE WITH A DEVICE FOR ADJUSTING A LIGHT BEAM

CROSS REFERENCE TO RELATED APPLICATIONS

Referenced-Applications

This application claims priority of the German patent application 101 11 824.4, filed Mar. 13, 2001, which is incorporated by reference herein.

BACKGROUND OF INVENTION

The invention concerns a method for adjusting a microscope. Especially the invention concerns a method for adjusting at least one section of a light beam in a microscope, whereby the section is determined by an adjustable optical element and a position, at which a device for adjusting is positioned.

Moreover, the invention concerns a microscope with a device for adjusting the light beam in the microscope.

The propagation of a light beam can be described adequately by four characteristic parameters, that is by the spatial offset of the light beam from the optical axis of the optical system, characterized by two coordinates which result from a parallel shift of the light beam with respect to the optical axis in a plane perpendicular to the optical axis, the angle under which the light beam itself or a line laid through the light beam cuts the optical axis after the parallel shift (elimination of the offset), as well an angle which describes the spatial position of the plane, with respect to a fixed coordinate system, which is defined by two lines each of which running through the light beam and the optical axis.

In the U.S. Pat. No. 5,206,766 a method and a device is disclosed which is used for the adjustment of a laser diode in an optical scanner. For the exact adjustment, in front of the scanner an opaque disc with an aim mark is installed. The exact adjustment of the laser diode is achieved when the laser beam meets the aim mark.

The U.S. Pat. No. 5,717,666 shows an adjustment apparatus for an optical means, to determine and equalize the offset between the central axis of a lens and the optical axis of a laser beam. The apparatus discloses a first and a second photo detector. The first photo detector is movable along the central axis of the lens to thus determine the offset. With the second photo detector the distribution of the laser beam is determined. Further, a beam splitter is provided which directs the laser beam onto both photo detectors. A mechanism moves the laser light source on the basis of the signals obtained from both photo detectors to adjust the laser light source accordingly.

SUMMARY OF INVENTION

It is the object of the present invention to provide a method with which the beam path in an optical system, for example a microscope, can be adjusted in a simple manner.

The above object is solved by a method which comprises the following steps:

coupling in a light beam of a microscope into the device for adjusting the light beam and thereby generating a coupled in light beam in the device;

directing the coupled in light beam to at least two photo detectors wherein each of the photo detectors are spaced differently from the position;

determining the deviation of the coupled in light beam from the nominal position by the electrical signals of the photo detectors and adjusting the optical element by at least one set element for bringing the coupled in light beam into nominal position.

Another object of the invention is to provide a microscope which can be adjusted in a simple, fast and safe manner and where its adjustment can be checked, as well.

The object is solved by a microscope comprising:

an illumination source for illuminating a sample, a microscope optic, wherein the illumination source and the microscope optic define an optical axis of the microscope, at least one adjustable optical element is provided on the optical axis of the microscope, and at least one device for adjusting is mounted at a position downstream from the optical element on the optical axis of the microscope.

This has the advantage that especially in the optical device construction the characteristic beam parameters are measured in the optical system at least at one position of a beam path. The use of the device for adjusting is especially advantageous in a microscope. Thereby the microscope possesses corresponding positions at which the device for adjusting can be mounted. On the basis of this measurement certain optical elements can be changed in the optical system and microscope, respectively, in its position by set elements in order to change the spatial position of the light beam in the optical system so, that the light beam is brought into the nominal position. The required nominal position of the light beam coincides with the optical axis defined by the optical system.

The device according to the invention can be mounted at each place of the optical system and microscope, respectively. The device can be mounted in two different ways at the optical system. The first possibility is that the light beam of the optical system arrives directly and without deviation in the device. The device is provided directly by a corresponding fixation at a coupling-in point in the beam path of the optical system. The device is equipped with means for coupling in by which a coupled in light beam is generated which reaches the device without angle change. The means for coupling-in is, for example, a lens or a beam extenuator (grey filter). The second possibility is that the light beam of the optical system arrives in the device with a deflection (with angle change) thereby defining the coupled-in light beam in the device. At the coupling-in point, the light beam arrives by means of a beam splitter or a conventional mirror in the device.

The minimal requirement for the device is that at least a first and a second photo detector are arranged at different distances to the coupling-in point. Preferably, the photo detectors are configured as 2-dimensional, position-sensitive detectors. In the device, at least one redirection means is provided which directs the coupled-in light beam onto the first photo detector. The portion of the coupled-in light beam passing the redirection means arrives on the second photo detector. At or in the device the photo detectors can be mounted differently. The only requirement for mounting the photo detectors is, that the photo detectors are located in respectively different distances to the coupling-in point. In a further embodiment of the invention, aim marks are provided in addition to the photo detectors. The aim marks are an additional visual control for the user with respect to the quality of the adjustment. For the adjustment, it is however sufficient to rely exclusively on photo sensors. Especially advantageous for determining the position of the light beam are electro-optical sensors, e.g. quadrant diodes or PSDs (Position Sensitive Detector). PSDs are used preferably, because quadrant diodes allow a position determination only within an area corresponding approximately to the light beam cross-section. The functionality of PSDs is well known to a skilled person, so a further explanation is not required. By reading the photo currents at the four electrodes, the place where the light beam hits within the photo sensor can be derived.

BRIEF DESCRIPTION OF DRAWINGS

Further advantages and advantageous embodiments of the invention are part of the following figures as well as of the specification. The figures show in detail.

DETAILED DESCRIPTION

Figure 1:
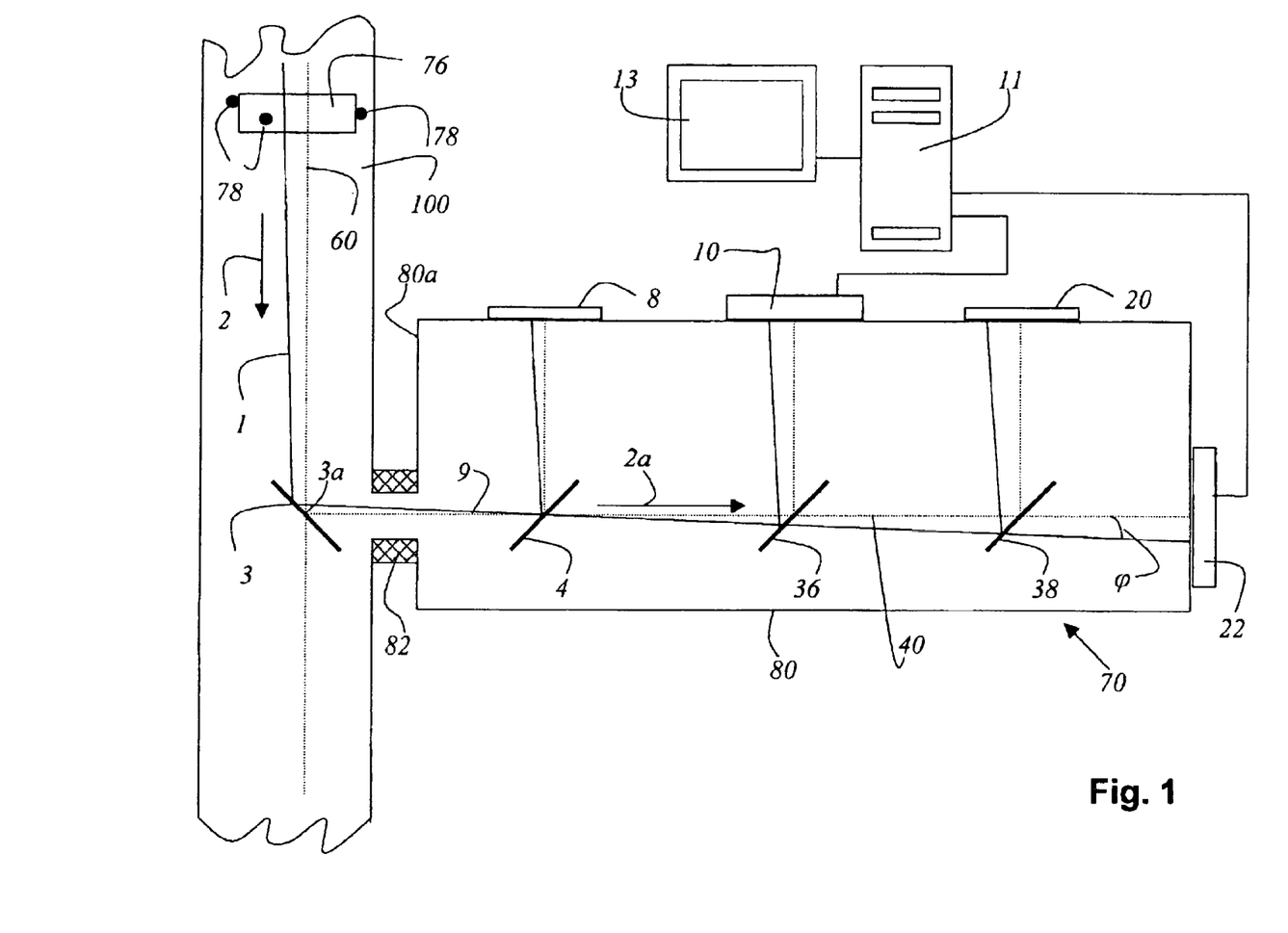
FIG. 1: a schematic representation of the device for adjusting, in connection with a computer and a display.

FIG. 1 shows an embodiment of a device 70 that permits not only an electronic ascertainment and reading of the position signals, but also a visual inspection. A light beam 1 which runs in the optical system 100 of a microscope 15 in a direction as indicated by arrow 2 is reflected into the device 70 by means for coupling-in 3. The means for coupling-in 3 may be in the form of a conventional beam splitter which is mounted permanently in an optical axis 60 defined by the optical system 100 of the microscope 15. The means for coupling-in 3 may as well be configured as a conventional mirror which is transferred only for determining the adjustment of the light beam 1 into the optical system 100 of the microscope 15, so that the light beam 1 is coupled into the device 70. The means for coupling-in 3 defines a coupled-in light beam 9 which is directed by beam splitters 4, 36, 38, provided in the device 70, onto at least two photo detectors 10 and 22. A first beam splitter 4 directs the coupled-in light beam 9 onto a first aim mark 8. The first beam splitter 4 is configured, for example, as a simple glass plate.

The coupled-in light beam 9 defines an optical axis 40 representing the straight beam path within a housing part 80 of the device 70. A second beam splitter 36 directs the light beam passing the first beam splitter 4 onto a first photo detector 10 which can be configured, for example, as a 2-dimensional, position-sensitive detector. The second beam splitter 36 is, for example, a coated 50/50-beam splitter. A third beam splitter 38 directs the light beam passing the second beam splitter 36 onto a second aim mark 20. The third beam splitter 38 can be configured also as a simple glass plate. The light beam passing the third beam splitter 38 arrives at a second photo detector 22 which is as well configured as a 2-dimensional, position-sensitive detector. The specific arrangement of the aim marks 8, 20 and the photo detectors 10, 22 as shown in FIG. 1 is only one selection of several possibilities. The only requirements are, that at least two photo detectors 10, 22 are provided on or in a housing part 80, that the photo detectors 10, 22 are arranged at different distances to the means for coupling-in 3, and that a photo detector 10 or 22 is spaced from the optical axis 40 of the coupled-in light beam 9 in the housing part 80. The first and second aim mark 8, 20 can be omitted. The spatial position of the means for coupling-in 3 defines a coupling-in point 3a.

The photo detectors 10 and 22 possess several electric connections which are connected to a computer 11. The computer 11 is configured, for example, as a PC or as an integrated circuit which carries out the required calculations for the determination of the adjustment of the optical system 100. The computer 11 has a display 13 (see FIG. 1), on which the current position of the to be adjusted light beam 1 in the optical system 100 of the microscope is graphically displayed. The first, second and third beam splitters 4, 36 and 38 as well as the second photo detector 22 are positioned in the path of the coupled-in light beam 9 and in the optical axis 40 of the coupled-in light beam 9, respectively. The path is marked by an arrow 2a. The housing part 80 of the device 70 is connected at the front side 80a by the flange 82 with the optical system 100 of the microscope 15. The connection serves to bring the device 70 into a defined position to the optical system 100 of the microscope 15. In the embodiment shown here, the coupled-in light beam 9 is guided with an angle change into the device 70. It is conceivable as well that the device 70 is connected with the optical system 100 of the microscope 15, so that the coupled-in light beam 9 arrives in the device 70 without an angle change.

Within the housing part 80, the coupled-in light beam 9 may be shifted parallel and/or spatially tilted to the optical axis 40 of the coupled-in light beam 9. The spatial inclination can unambiguously be described by two angles $\phi$ and $\theta$. The calculation of the distance of the light beam 1 to the optical axis 60 in the area of the means for coupling-in 3 results out of a simple triangle calculation. The distance of the ideally adjusted optical axis of the coupled-in light beam 40 from the beam splitter 36 to the first photo detector 10 and the distance of the beam splitter 36 to the second photo detector 22 influence the calculation. Using the first coordinates $(x_1, y_1)$ determined at the first photo detector 10 and the second coordinates $(x_2, y_2)$ determined at the second photo detector 22, the deviation of the coupled-in light beam 9 can be determined with respect to the optical axis 40 of the coupled-in light beam 9. The angle $\phi$ represents the angle by which the optical axis 40 intersects the coupled-in light beam 9 or a line defined by the coupled-in light beam 9 after parallel shift (elimination of the offset). The angle $\phi$ is calculated according to the following equation:

$$\varphi = \arctan\left(\frac{\sqrt{(x_2 - x_1)^2 + (y_2 - y_1)^2}}{b - a}\right)$$

Wherein $a$ is the distance of the beam splitter 36 to the first photo detector 10, and $b$ is the distance of the beam splitter 36 to the second photo detector 22. The angle $\theta$, also after elimination of the offset, describes the spatial position of a plane in a fixed coordinate system which is defined by two lines each of them passing through the coupled-in light beam 9 and the optical axis 40. The angle θ is calculated as follows:

$$\theta = \arctan\left(\frac{x_1 - x_2}{y_2 - y_1}\right) + 90°, \text{ for } y_2 - y_1 \geq 0$$

$$\theta = \arctan\left(\frac{x_1 - x_2}{y_2 - y_1}\right) + 270°, \text{ for } y_2 - y_1 < 0$$

The light beam 1 in the optical system 100 of the microscope 15 passes at least one optical element 76. This optical element 76 is adjustable so that the light beam 1 in the optical system 100 of the microscope 15 lies exactly in the optical axis 60. As a consequence of this adjustment, the coupled-in light beam 9 hits exactly a nominal position 72 in the device 70. The adjustment of the optical element 76 is carried out by several set elements 78 whereby the light beam 1 is manipulated in four different and independent directions, two lateral and two angle adjustments, in order to bring the light beam 1 into line with the optical axis 60. The user can move the set elements 78 by hand or all set elements 78 are automatically moved. The adjustment is electromechanical. The computer 11 compares permanently the changing actual position resulting from the movement of the set elements 78, and adjusts the movement of the set elements 78 in order to achieve a fast and efficient accomplishment of the nominal position.

Figure 2:
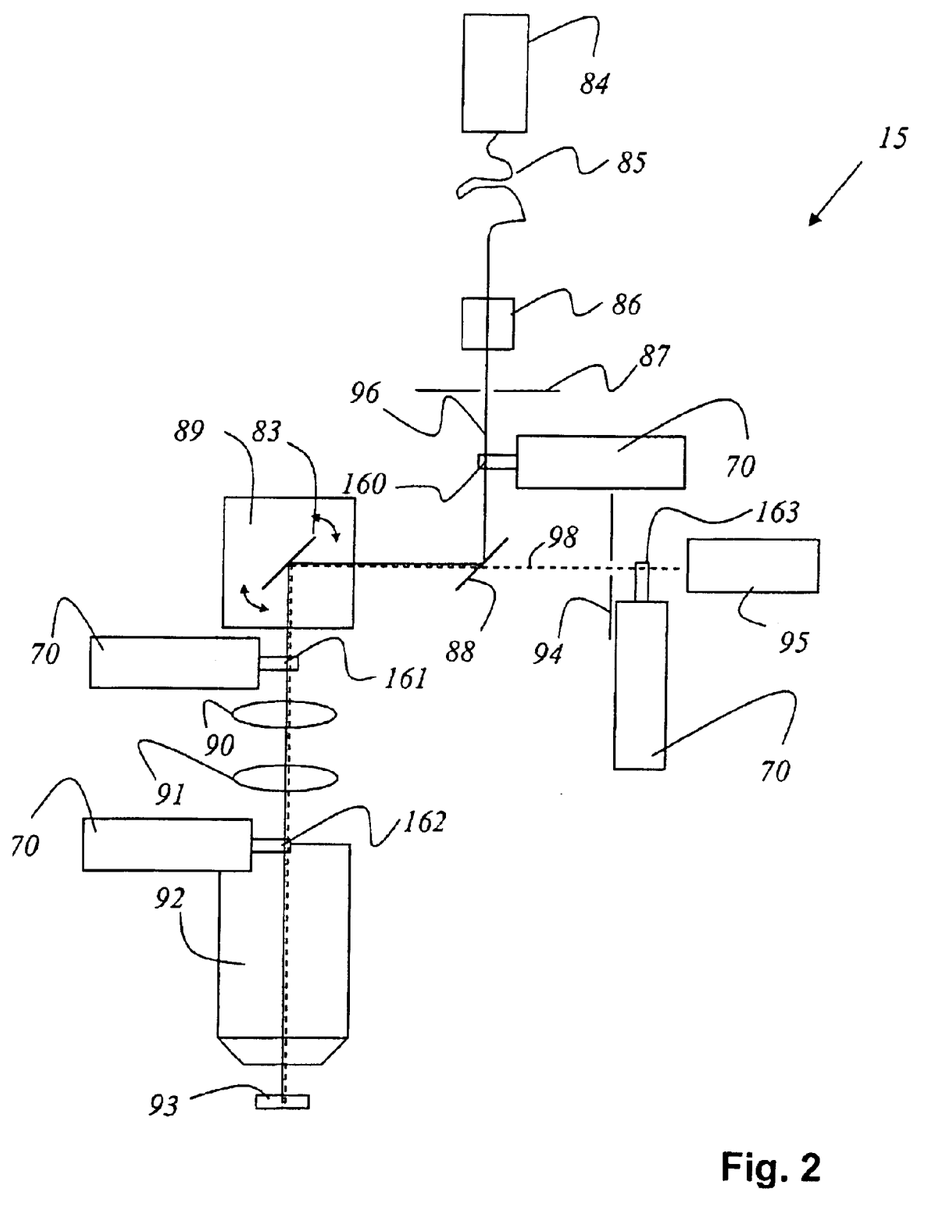
FIG. 2: a schematic representation of a microscope, the respective beam path and possible positions at the microscope of the devices for adjusting.

FIG. 2 shows schematically the design of a microscope 15. In the embodiment shown here, the schematic design of a confocal scanning microscope is described. The light emitted from an illumination source 84 is guided with a fiber 85 to a light coupling-in optic 86 which defines a illumination light beam 96 represented as a solid line in this embodiment. The illumination light beam 96 arrives at a beam splitter 88 via an illumination pinhole 87. The beam splitter 88 reflects the illumination light beam 96 to a scan module 89 including a cardanic scan mirror 83 which directs the illumination light beam 96 through a scan optic 90 and a further optic 91 to a microscope optic 92. The illumination light beam 96 is guided over and/or through a sample 93 by the scan module 89 and the microscope optic 92.

The illumination light beam 96 is guided over the sample surface in case of not transparent samples 93. In biological samples 93 or transparent samples, the illumination light beam 96 is guided also through the sample 93. This means that different focus planes of the sample 93 are scanned one after the other by the illumination light beam 96. The retroactive composition yields in a 3-dimensional image of the sample 93. The illumination light beam 96 emanating from the illumination source 84 is represented as a solid line. The light emanating from the sample 93 is a detection light beam 98 which is shown as a broken line in FIG. 2. The detection light beam 98 arrives through the microscope optic 92 and the scan module 89 at the beam splitter 88, passing a detection pinhole 94 and hitting a detector 95 which is configured as a photo multiplier. In the detector 95, electrical detection signals are produced which are proportional to the power of the detection light emanating from the sample 93. In the embodiment as shown in FIG. 2, four possible positions are shown of the device 70 for adjusting. A first position 160 is located between the illumination pinhole 87 and the beam splitter 88. The adjustment of the illumination light beam 96 is carried out at the light coupling-in optic 86 (see FIG. 3). A second position 161 is located between the scan module 89 and the scan optic 90. A third position 162 is located between an optic 91 and the microscope optic 92. A fourth position 163 may be located between the detection pinhole 94 and the detector 95.

Figure 3:
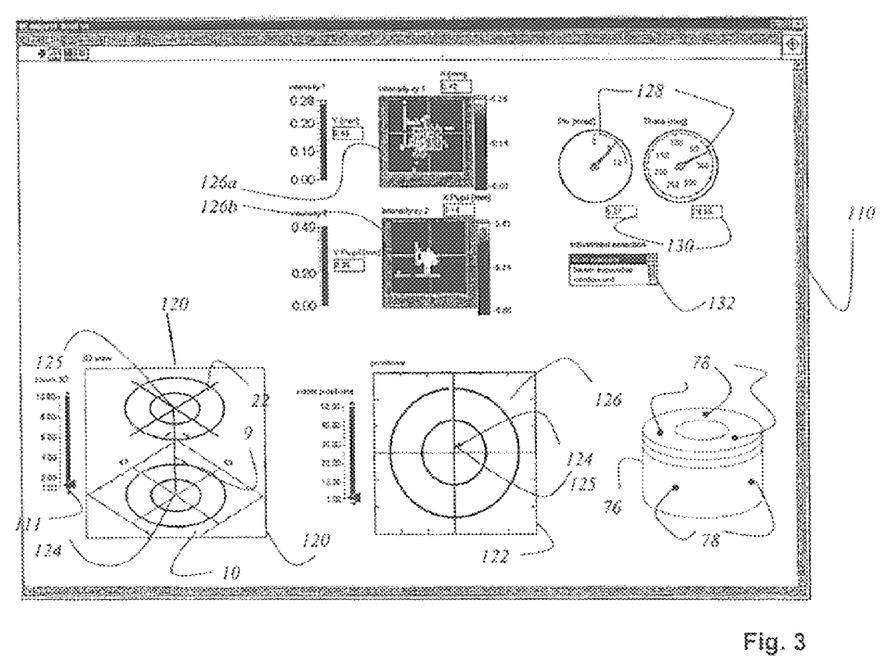
FIG. 3: an user-interface with a representation of the light coupling-in module and the respective set elements.

FIG. 3 shows an embodiment of an user-interface 110 for the visual representation on the display 13 of the deviation of the actual position of the coupled-in light beam 9 from the nominal position. The actual position with respect to the optical axis 40 is unambiguously characterized by parallel offset to the optical axis 40 and/or inclination to the optical axis 40. The user-interface 110 is designed in several sections. In a first screen 120, a spatial view of the places of impact 124 and 125 of the coupled-in light beam 9 is shown on both photo detectors 10 and 22. Next to this first view 120, a zoom scale 111 is provided, that permits an alteration of the zoom in the first view 120. Next to the first screen 120, a projection view 122 is provided. The places of impact 124 and 125 of the coupled-in light beam 9 on the photo detectors 10 and 22 are indicated on a schematic representation of the photo detector surface 126. Furthermore, the angles φ and θ are shown not only in a graphical angle display 128 but also in a numerical angle display 130 on the user-interface 110. The user is provided in a further screen 126a with the intensity and the place of impact of the light beam on the first photo detector 10 in real time. The user can pursue here in addition the change of the position of the light beam based on the adjustment of the set elements 78. Beneath the screen 126a, a further screen 126b is shown, that represents the intensity and the position of the light beam on the second detector 22. In both screens 126a and 126b, the position of the light beam is represented by a shining light point. The intensity is represented by a grey gradation or by selected color scales.

Beneath the graphical and numerical angle display 128 and 130 a selection window 132 is provided, with which the optical element 76 to be adjusted can be selected. In FIG. 3 the light coupling-in optic 86 is selected as the optical element 76.

Furthermore on the user-interface 110, an image of the optical element 76 is arranged, whereby it is indicated to the user which set elements 78 must be actuated in order to bring the light beam 1 into the nominal position 72. All display, views and statements run online in real time.

Figure 4:
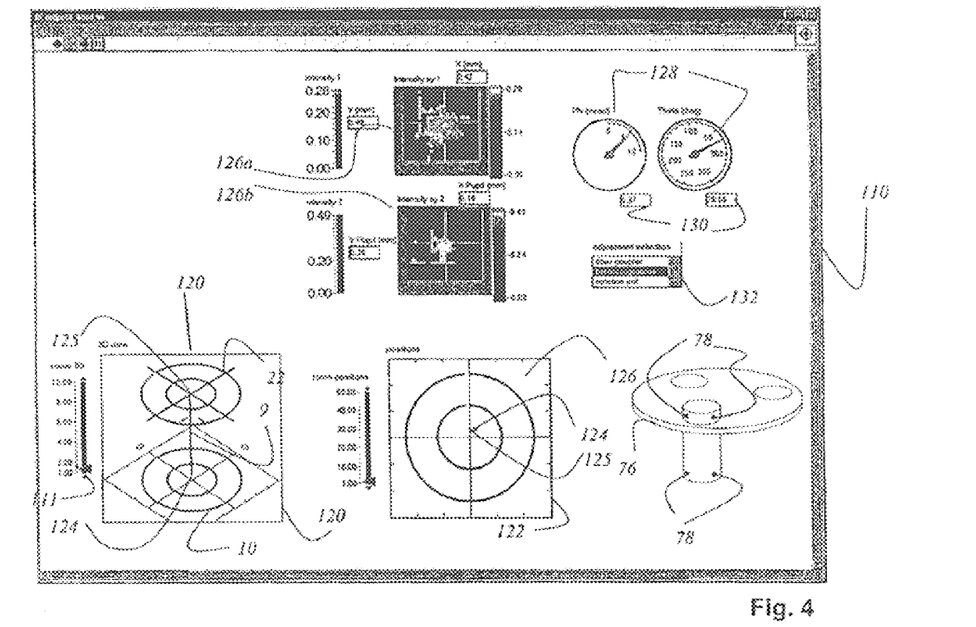
FIG. 4: an user-interface with a representation of the K-scanner and the respective set elements.

FIG. 4 shows an embodiment of the user-interface 110, in that the representation of the first screen 120, the projection view 122, the graphical and numerical angle display 128 and 130, the screens 126a and 126b and the selection window 132 are identical with those of FIG. 3. In the embodiment of the user-interface 110 as shown in FIG. 4 another optical element 76 is represented. On the optical element 76 several set elements 78 are marked as well. It is indicated to the user which set element should be changed in order to bring the light beam 1 into the nominal position 72. The marking of the optical elements can be done by a colored marking. In the embodiment of the FIG. 4 a K-scanner is shown.

Figure 5:
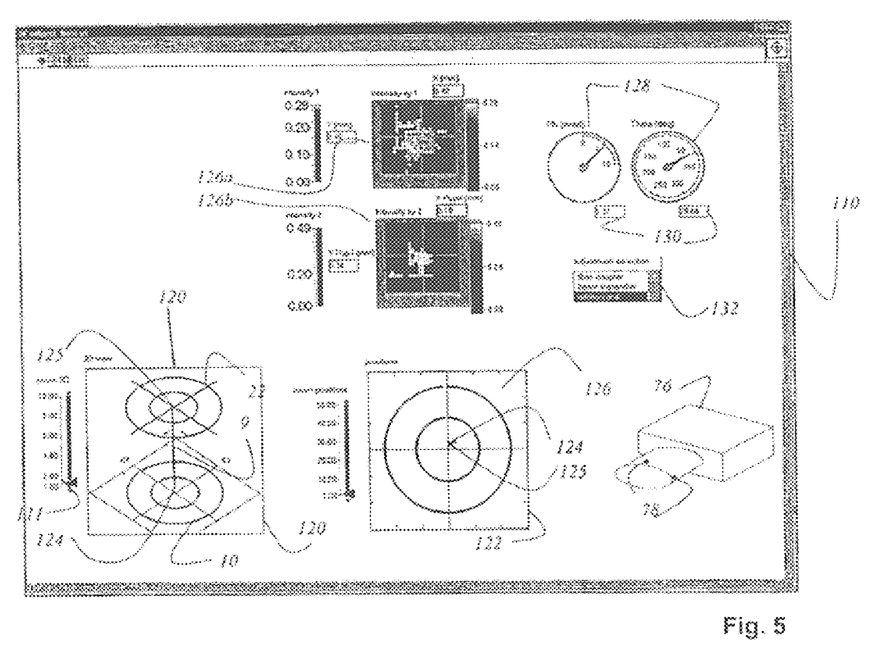
FIG. 5: an user-interface with a representation of the module for beam expander and the respective set elements.

In the embodiment of the user-interface 110 as shown in FIG. 5 a further optical element 76 is represented. On the optical element 76 several set elements 78 are marked as well. It is indicated to the user which set element should be changed in order to bring the light beam 1 into the nominal position 72. The marking of the optical elements is also done by a colored marking. The set elements to be actuated are marked for example with red. In the embodiment as shown in FIG. 5 a beam expansion module is provided. Furthermore, all the other views on the user-interface 110 are identical with the representations of FIG. 3 and FIG. 4. Consequently, there is no need to go into further detail here.

The invention has been described with respect to specific embodiments. It is however obvious that changes and alteration can be carried out without leaving the scope of the claims below.

What is claimed is:

1. A method for adjusting at least one portion of a light beam in a microscope, wherein the portion is defined by an adjustable optical element and a position, at which a device for adjusting is mounted, comprises the following steps:

coupling in a light beam of a microscope into the device for adjusting the light beam and thereby generating a coupled in light beam in the device;

directing the coupled in light beam to at least two photo detectors wherein each of the photo detectors are spaced differently from the position;

determining the deviation of the coupled in light beam from the nominal position by the electrical signals of the photo detectors; and adjusting the optical element by at least one set element for bringing the coupled in light beam into nominal position.

2. Method as defined in claim 1 wherein the adjustment of the optical element is carried out by the user, and the optical element and the at least one set element to be changed are shown to the user on a display, so that the coupled in light beam is brought into the nominal position.

3. Method as defined in claim 1 wherein the adjustment of the optical element is carried out automatically and the optical element and the at least one set element to be changed are shown a display and the actually and automatically changed set element is high lighted on the display, so that the coupled in light beam is brought into the nominal position.

4. Method as defined in claim 3 wherein the at least one set element are operated electromechanically.

5. Method as defined in claim 1 wherein for visual control of the nominal position the coupled in light beam is positionable with reference to at least one visual aim mark.

6. Method as defined in claim 1 comprising the following steps:

determining the spatial position of the light beam in a portion of the microscope, wherein the coupled in light beam is guided to two photo detectors, which are configured as 2-dimensional position sensitive sensors, and calculating the position of the light beam in the portion of the microscope relative to the defined optical axis from the places of impact of the coupled in light beam on the position sensitive sensors.

7. Method as defined in claim 6 comprising the further steps:

displaying the deviation of a place of impact of the light beam from the nominal position in graphical or numerical form on a display connected to a computer, wherein the computer is connected to the device for adjustment, and displaying the change of the places of impact of the light beam during the change of the at least one set element.

8. Method as defined in claim 7 wherein the deviation of the places of impact from the nominal position of the coupled in light beam on the first photo detector is determined by first coordinates and is determined on the second photo detector by second coordinates.

9. Method as defined in claim 1 wherein a first position is placed between a light coupling in optic and a beam splitter.

10. Method as defined in claim 1 wherein a second position, is placed between a scan module and a scan optic.

11. Method as defined in claim 1 wherein a third position is placed between an optic and a microscope optic.

12. Method as defined in claim 1 wherein a fourth position is placed between a detection pinhole and a detector.

13. A microscope comprising:

an illumination source for illuminating a sample;

a microscope optics, wherein the illumination source and the microscope optics define an optical axis of the microscope;

at least one adjustable optical element provided along the optical axis of the microscope; and at least one device for adjusting by determining a position of a light beam with respect to the optical axis of the microscope, the device for adjusting being mounted at a position downstream from the optical element along the optical axis of the microscope.

14. Microscope as defined in claim 13, wherein the device for adjusting comprises means for coupling in a light beam to be adjusted into the device, a coupling in point and a coupled in light beam are defined by the means for coupling in, at least a first and a second detector, each positioned in different distances to the coupling point, and at least one beam splitter is provided in the coupled in light beam, wherein the beam splitter directs the coupled in light beam onto at least one of the photo detectors.

15. Microscope as defined in claim 14 wherein an at least one aim mark is provided for a visual control of the individual places of impact of the coupled in light beam on the first and the second photo detector and the aim mark is placed apart from the coupling in point.

16. Microscope as defined in claim 14, wherein the photo detectors are configured as 2-dimensional position sensitive sensors.

17. Microscope as defined in claim 16, wherein a computer and a display are provided, and the deviation of the place of impact of the light beam from a nominal position is shown in graphical or numerical form on the display.

18. Microscope as defined in claim 17, wherein at least one adjustable optical element together with several set elements is shown on the display, and at least one of the set elements is high lighted, which needs to be changed for adjusting the optical element in order to bring the coupled in light beam and consequently the light beam into the nominal position.

19. Microscope as defined in claim 18, wherein the adjustment of the high lighted set element is carried out by the user.

20. Microscope as defined in claim 18, wherein the adjustment of the optical element is carried out automatically and the set elements are operated electromechanically.

21. Microscope as defined in claim 14, wherein the deviation of the places of impact from the nominal position of coupled in light beam on the first photo detector is determined by first coordinates and on the second photo detector is determined by second coordinates.

22. Microscope as defined in claim 13, wherein the microscope is a confocal scanning microscope.

23. Microscope as defined in claim 22, comprises a light coupling in optic, which couples the light coming from the illumination source into the optical axis of the confocal scanning microscope, an illumination pinhole is positioned downstream from the light coupling in optic, a beam splitter directing the illumination light beam onto a scan module, a scan optic, an optic and a microscope optic, which images the illumination light beam onto a sample and a detector with a detection pinhole for detecting the detection light beam.

24. Microscope as defined in claim 23, wherein a first position is placed between the light coupling in optic and the beam splitter.

25. Microscope as defined in claim 23, wherein a second position is placed between the scan module and the scan optic.

26. Microscope as defined in claim 23, wherein a third position is placed between the optic and the microscope optic.

27. Microscope as defined in claim 26, wherein a fourth position is placed between position a detection pinhole and the detector.

* * * * *